United States Patent
Crisolo

(10) Patent No.: US 10,402,127 B2
(45) Date of Patent: Sep. 3, 2019

(54) IMAGE FORMING APPARATUS FORMING IMAGE ON RECORDING SHEET, AND IMAGE FORMING METHOD

(71) Applicant: KYOCERA Document Solutions Inc., Osaka (JP)

(72) Inventor: Kenth Remon Crisolo, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/037,266

(22) Filed: Jul. 17, 2018

(65) Prior Publication Data

US 2019/0034131 A1    Jan. 31, 2019

(30) Foreign Application Priority Data

Jul. 31, 2017   (JP) .................................. 2017-148138

(51) Int. Cl.
*G06K 15/00*    (2006.01)
*G06F 3/12*     (2006.01)

(52) U.S. Cl.
CPC .......... *G06F 3/1207* (2013.01); *G06F 3/1218* (2013.01); *G06F 3/1239* (2013.01); *G06F 3/1259* (2013.01); *G06F 3/1285* (2013.01); *G06F 3/1222* (2013.01); *G06F 3/1238* (2013.01)

(58) Field of Classification Search
None
See application file for complete search history.

(56) References Cited

U.S. PATENT DOCUMENTS

2006/0290967 A1* 12/2006 Sumitomo ............. G03G 21/04
                                                      358/1.14
2009/0174895 A1*  7/2009 Huster .................. G06F 3/1207
                                                      358/1.15

FOREIGN PATENT DOCUMENTS

JP         2010-030051 A      2/2010

* cited by examiner

*Primary Examiner* — Henok Shiferaw
(74) *Attorney, Agent, or Firm* — IP Business Solutions, LLC

(57) ABSTRACT

An image forming apparatus includes a print restriction information table, a print job receiver, a print job decider, a communication unit, a print job reception notifier, and a print job executor. The print restriction information table contains a document under print restriction and an approver. The print job receiver receives a print job for printing the document. The print job reception notifier transmits a notice that the print job has been received, to the terminal managed by the approver through the communication unit, when the print job decider has decided that the print job is for printing the document registered in the print restriction information table. The print job executor executes the print job, when the print job that is same as the print job received by the print job receiver is received from the terminal managed by the approver.

7 Claims, 7 Drawing Sheets

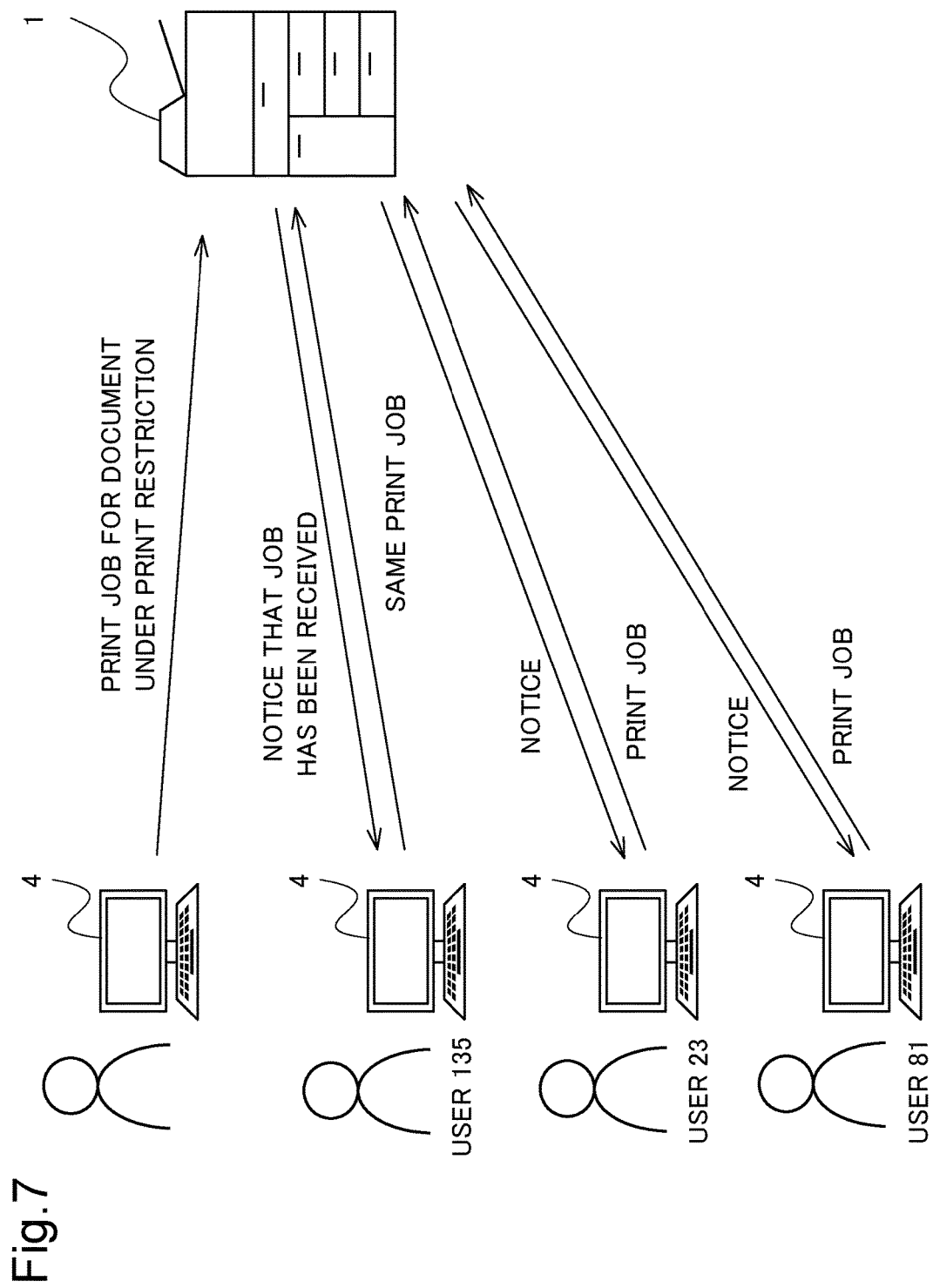

IMAGE FORMING APPARATUS FORMING IMAGE ON RECORDING SHEET, AND IMAGE FORMING METHOD

INCORPORATION BY REFERENCE

This application claims priority to Japanese Patent Application No. 2017-148138 filed on Jul. 31, 2017, the entire contents of which are incorporated by reference herein.

BACKGROUND

The present disclosure relates to an image forming apparatus and an image forming method, and more particularly to a technique to print a document restricted from being printed, by obtaining approval for printing from an approver.

Nowadays, some printing apparatuses are configured to set conditions of use with respect to each of users, for example approval or disapproval for printing, color or B/W printing, single-sided or double-sided printing, or to restrict the period and time of day for printing, for the purpose of managing consumables such as recording sheets, as well as security management, when executing document printing jobs. For example, in a printing system in which a host apparatus and the printing apparatuses are connected to each other via a network, the printing apparatus is configured to decide, upon receipt of print data including information of the user name from the host apparatus, whether the user name information included in the print data accords with the user name information stored in a storage device. In the case where the user name information accords with each other, the printing apparatus reads out the printing condition and information of the period or time of day for printing, corresponding to the user name, and executes the printing when the printing job to be executed accords with the printing condition and the period or time of day for printing.

SUMMARY

The disclosure proposes further improvement of the foregoing technique.

In an aspect, the disclosure provides an image forming apparatus including a print restriction information table, a print job receiver, a print job decider, a communication unit, a print job reception notifier, and a print job executor. The print restriction information table is stored in a storage unit, and contains a document under print restriction, and an approver from whom approval for execution of a print job for printing the document is to be obtained, in association with each other.

The print job receiver receives a print job for printing the document. The print job decider decides whether the print job received by the print job receiver is a print job for printing a document registered in the print restriction information table. The communication unit performs communication with a terminal managed by the approver. The print job reception notifier reads out the approver from whom the approval for execution of the print job is to be obtained, from the print restriction information table, when the print job decider has decided that the print job is for printing the document registered in the print restriction information table, and transmits a notice that the print job for printing the document has been received, to the terminal managed by the approver, through the communication unit. The print job executor executes the print job received by the print job receiver, when the communication unit has received the print job that is same as the print job received by the print job receiver, from the terminal managed by the approver and to which the print job reception notifier has transmitted the notice.

In another aspect, the disclosure provides an image forming method including receiving a print job, deciding the print job, notifying reception of the print job, and executing the print job. The receiving of the print job includes receiving the print job for printing a document. The deciding of the print job includes deciding, on a basis of a print restriction information table, whether the print job received in the receiving of the print job is a print job for printing a document registered in the print restriction information table; the print restriction information table is stored in a storage unit, and contains a document under print restriction and an approver from whom approval for execution of a print job for printing the document is to be obtained, in association with each other. The notifying of the reception of the print job includes reading out the approver from whom the approval for execution of the print job is to be obtained, from the print restriction information table, when it is decided, in the deciding of the print job, that the print job is for printing the document registered in the print restriction information table, and transmitting a notice that the print job for printing the document has been received, to a terminal managed by the approver. The executing of the print job includes executing the print job, when the print job that is same as the print job received in the receiving of the print job is received from the terminal managed by the approver, after the transmission of the notice in the notifying of the reception of the print job.

BRIEF DESCRIPTION OF THE DRAWINGS

FIG. 7 is another conceptual drawing showing how the image forming apparatus requests for approval to the approver.

DETAILED DESCRIPTION

Figure 1:
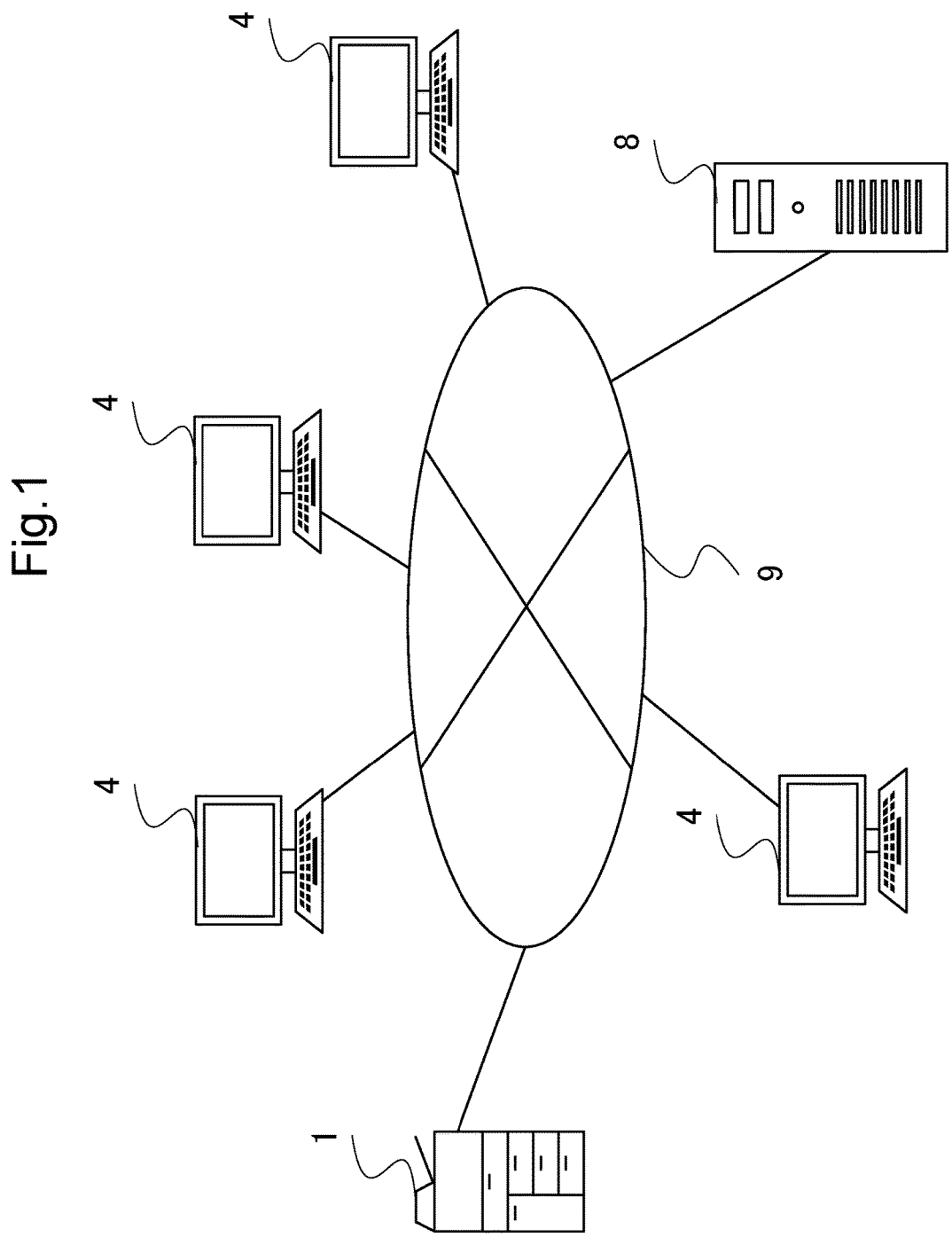
FIG. 1 is a schematic drawing showing a general configuration of a system that includes an image forming apparatus according to an embodiment of the disclosure.

Hereafter, an image forming apparatus according to an embodiment of the disclosure will be described, with reference to the drawings. FIG. 1 is a schematic drawing showing a general configuration of a system that includes the image forming apparatus according to the embodiment of the disclosure.

The system includes the image forming apparatus 1 according to the embodiment of the disclosure, a plurality of user terminals 4, a server apparatus 8, and a network 9. The image forming apparatus 1, the plurality of user terminals 4, and the server apparatus 8 are connected to the network 9 wirelessly or via wire, to make communication between each other. The user terminals 4 are, for example, a PC, a smartphone, a tablet terminal, and the like, all of which are configured to make access to the server apparatus 8, acquire a document stored therein, generate print job based on the document, and transmit the print job to the image forming apparatus 1. Upon receipt of the print job from a given user terminal 4, the image forming apparatus 1 executes the print job and outputs a printed sheet.

In this system, it will be assumed that one of the plurality of user terminals 4 corresponds to the terminal that generates the print job for printing the document under print restriction and transmits the print job to the image forming apparatus 1, and the other user terminals 4 correspond to the terminal of an approver authorized to give approval for the image forming apparatus 1 to execute the print job. In this system, it is stipulated that a document under print restriction is not permitted to be printed by the image forming apparatus 1, unless the approval is obtained from the approver.

Figure 2:
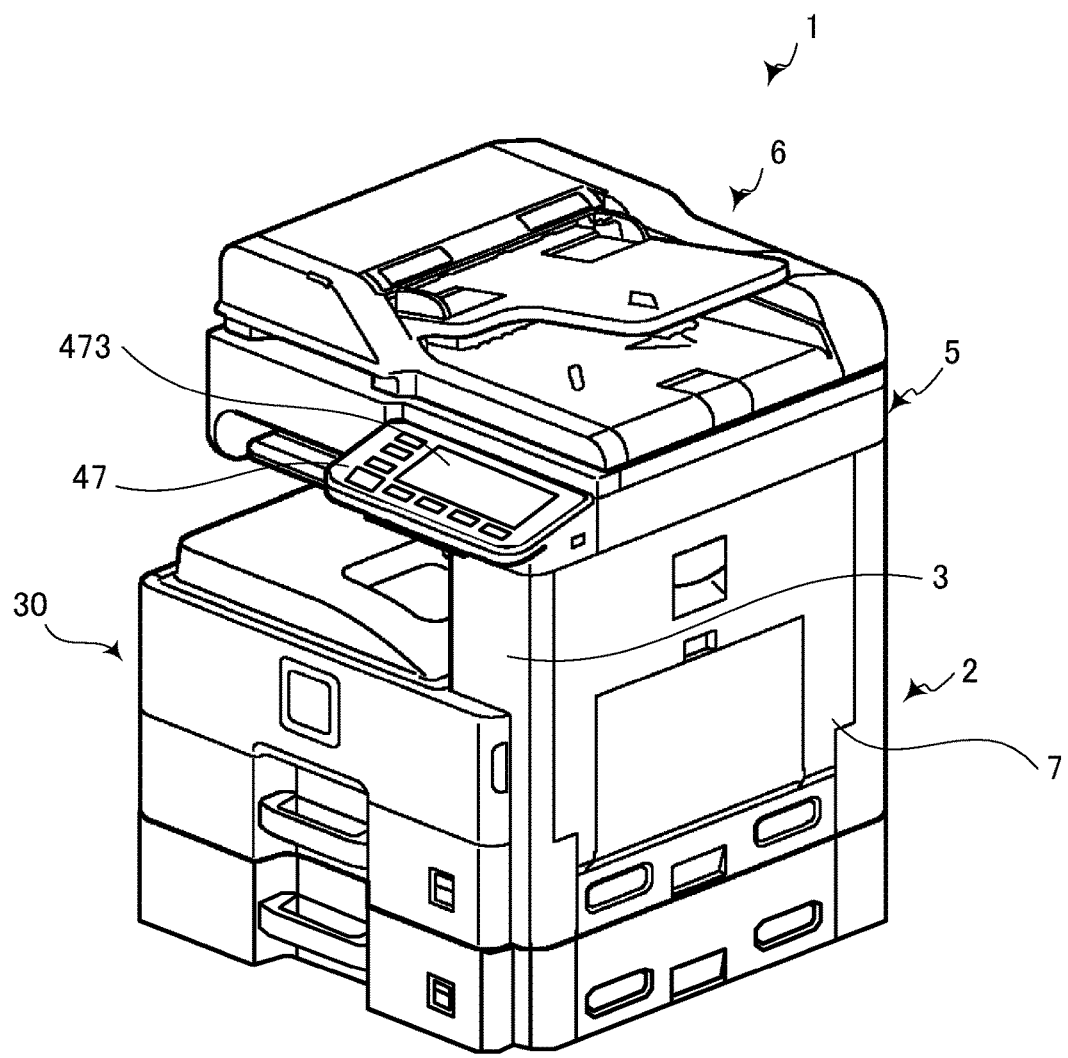
FIG. 2 is a perspective view showing the appearance of the image forming apparatus according to the embodiment of the disclosure.

FIG. 2 is a perspective view showing the appearance of the image forming apparatus according to the embodiment of the disclosure. The image forming apparatus 1 according to the embodiment of the disclosure is a multifunction peripheral configured to execute a plurality of functions including, for example, a facsimile function, a copying function, a printing function, and a scanning function. As shown in FIG. 2, the image forming apparatus 1 includes a main body 2, an image reading unit 5 located on the upper side of the main body 2, and a joint unit 3 provided between the image reading unit 5 and the main body 2.

The casing 7, constituting the outer shell of the image forming apparatus 1, includes therein a plurality of components that realize the functions of the image forming apparatus 1. For example, the image reading unit 5, an image forming unit 12 (see FIG. 3), a fixing unit 13 (see FIG. 3), and a paper feed unit 30 are accommodated in the casing 7.

The operation unit 47 is an interface device for the user to operate the image forming apparatus 1, and to input information such as characters and numerals. The operation unit 47 includes a touch panel 473 for displaying an operation guide screen for the user, or setting screen for various functions. The operation unit 47 detects a touch operation performed by the user on an icon or button displayed on the touch panel 473, to thereby receive an instruction for setting detailed items of the functions that the image forming apparatus 1 is configured to execute, or for executing the functions, according to the input made by the touch operation.

Figure 3:
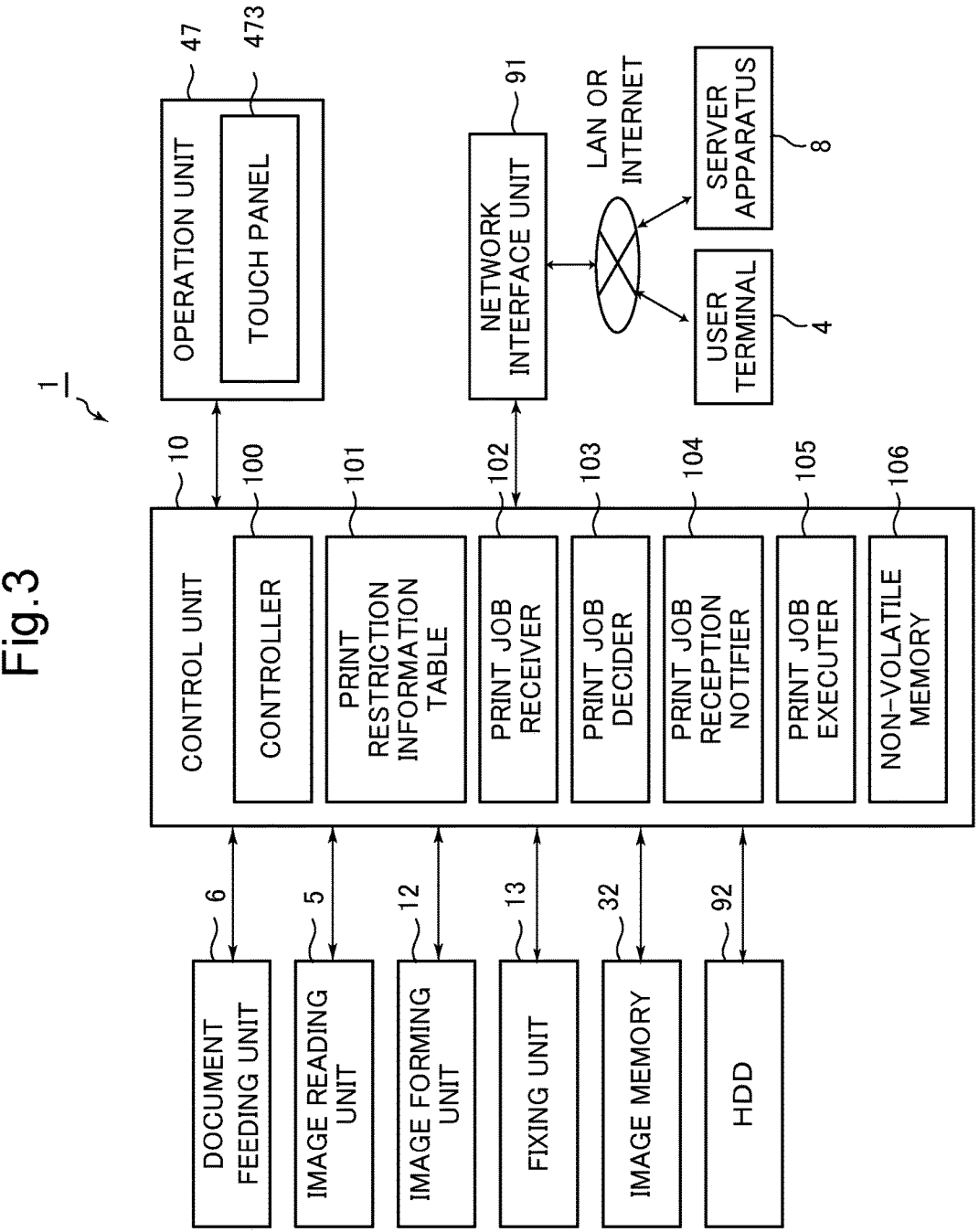
FIG. 3 is a block diagram showing an example of an essential internal configuration of the image forming apparatus.

Hereunder, a configuration of the image forming apparatus 1 will be described. FIG. 3 is a functional block diagram showing an example of an essential internal configuration of the image forming apparatus 1.

The image forming apparatus 1 includes a control unit 10. The control unit 10 includes a processor, a RAM, a ROM, an exclusive hardware circuit, and so forth. The processor is, for example, a central processing unit (CPU), a MPU, an ASIC, or the like.

The image reading unit 5 includes a reading mechanism having a light emitter and a CCD sensor. The image reading unit 5 is configured to read an image from a source document by irradiating the source document with the light emitter and receiving the reflected light with the CCD sensor, and to generate image data, under the control of the control unit 10. The image reading unit 5 reads the image of the source document transported by the document feeding unit 6, in a designated reading size.

The image memory 32 is a region for temporarily storing the source image acquired through the reading operation performed by the image reading unit 5, and the image to be printed by the image forming unit 12.

The image forming unit 12 forms an image based on the source image read by the image reading unit 5, or according to the print job received from the user terminal 4 connected to the network wirelessly or via wire, through a network interface unit 91, exemplifying the communication unit in What is claimed is.

The fixing unit 13 heats a recording sheet on which a toner image has been formed through the image forming operation performed by the image forming unit 12, to thereby fix the image on the recording sheet by thermal compression.

The operation unit 47 receives, as described above, instructions from the user to execute the functions and operations to be executed by the image forming apparatus 1. The operation unit 47 includes the touch panel 473 for displaying the operation guide screen for the user, and other types of screens.

The HDD 92 is a large-capacity storage device for storing the source image read by the image reading unit 5, the print job transmitted from the user terminal 4, and so forth.

The control unit 10 includes a controller 100, a print restriction information table 101, a print job receiver 102, a print job decider 103, a print job reception notifier 104, and a print job executor 105. The control unit 10 acts as the controller 100, the print job receiver 102, the print job decider 103, the print job reception notifier 104, and the print job executor 105, when the processor executes a computer program stored in the ROM or HDD 92. Here, the controller 100, the print job receiver 102, the print job decider 103, the print job reception notifier 104, and the print job executor 105 may each be constituted in the form of a hardware circuit, instead of being performed according to the computer program.

The print restriction information table 101 is stored, for example, in a non-volatile memory 106, exemplifying the storage unit in What is claimed is, incorporated in the control unit 10. The controller 100 edits the print restriction information table 101, according to the operation performed by the user through the operation unit 47. The controller 100 also edits the name of the document under print restriction, and approver identification information regarding that document, the document name and the approver identification information being stored in the print restriction information table 101, according to the instruction transmitted from the user terminal 4 and received by the network interface unit 91. Here, the instruction is generated by a printer driver installed in the user terminal 4, according to the operation of the user performed on the user terminal 4.

Figure 4:
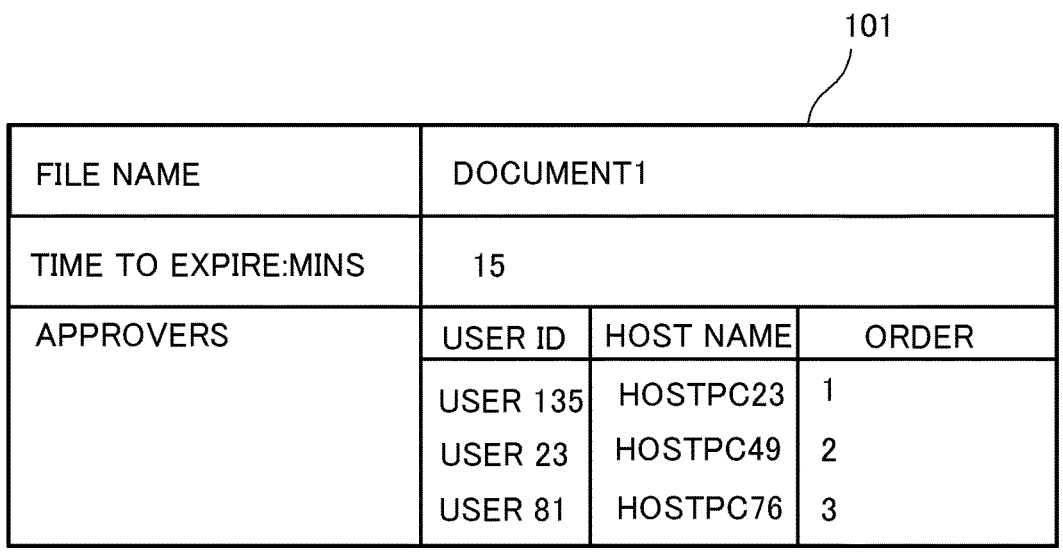
FIG. 4 illustrates an example of data recorded in a print restriction information table.

In the print restriction information table 101, the document under print restriction and the approver identification information, indicating the approver from whom the approval for execution of the print job for printing the document is to be obtained, are stored in association with each other. FIG. 4 illustrates an example of the data recorded in the print restriction information table 101, in which one document is stored. In FIG. 4, the document under print restriction is identified by a name "document 1" indicated in the column of "File name". The document under print restriction is stored, for example, in a shared folder in the server apparatus 8, and all the users can make access to the server apparatus 8 through their respective user terminals 4, so that the document is transmitted to the image forming apparatus 1 from the server apparatus 8, in response to the instruction from the user terminal 4.

Upon receipt of the instruction from the user terminal 4, a controller of the server apparatus 8 generates the print job for printing the document, and transmits the print job to the image forming apparatus 1, through an own communication unit of the server apparatus 8. Alternatively, the print job may be transmitted to the image forming apparatus 1 from the user terminal 4. In this case, the user terminal 4 performs the same operation as performed by the server apparatus 8, described above.

In addition, the approver, from whom the approval for execution of the print job for printing the document is to be obtained, is identified according to the column of "Approvers". FIG. 4 illustrates the example in which three approvers are registered.

The approvers are each stored in the print restriction information table 101, in the form of the approver identification information including a combination of a user ID and a host name. Accordingly, when the user identified by the user ID is using the user terminal 4 identified by the host name, the user is authorized to be the approver. In the case where there are a plurality of approvers, the print job executor 105 executes the print job for printing the document under print restriction, when the approval (details will be subsequently described) is received from the user terminal 4 of each of the approvers. Thus, a higher security level for the document can be attained.

When there are a plurality of approvers, the order of approval by each of the approvers is stored in the print restriction information table 101. In the example shown in FIG. 4, the order of approval is specified in the column of "Order". When the order of approval is specified, the print job executor 105 executes the print job for printing the document under print restriction, upon receipt of the approval from each of the approvers, in the specified order of approval. Such an arrangement further upgrades the security level for the document.

Further, the print restriction information table 101 contains a time limit for receiving the approval from all the approvers. In the example shown in FIG. 4, the time limit is specified as "15" in the column of "Time to expire: mins". This means that the approval for execution of the print job has to be received from all of the approvers, within 15 minutes after the image forming apparatus 1 has received the print job for printing the document under print restriction named as "document 1". In the case where the approval has been received by the network interface unit 91 from all of the approvers within the time limit, the print job executor 105 executes the print job for printing the document under print restriction. On the contrary, unless the approval is received by the network interface unit 91 from all of the approvers within the time limit, the print job executor 105 does not execute the print job for printing the document under print restriction. Such an arrangement further upgrades the security level for the document.

Back to FIG. 3, the controller 100 serves to control the overall operation of the image forming apparatus 1. The controller 100 is connected to the image reading unit 5, the document feeding unit 6, the image memory 32, the image forming unit 12, the fixing unit 13, the operation unit 47, the touch panel 473, the network interface unit 91, and the HDD 92, and controls the operation of each of the cited components.

The print job receiver 102 receives the print job transmitted from the server apparatus 8 or the user terminal 4, through the network interface unit 91, and stores the print job in a storage region such as the image memory 32 or the HDD 92.

The print job decider 103 decides whether the print job received by the print job receiver 102 is a print job for printing a document registered in the print restriction information table 101, in other words a document the name of which is stored in the print restriction information table 101. The print job possesses the name of the document to be printed, as meta-information. Accordingly, the print job decider 103 can acquire the name of the document to be printed according to the print job, from the meta-information of the print job received by the print job receiver 102, and decide whether the print job received by the print job receiver 102 is for printing the document under print restriction stored in the print restriction information table 101, through comparison between the document name according to the meta-information and the document name stored in the print restriction information table 101.

The print job reception notifier 104 reads out all the approvers, from whom the approval for execution of the print job for printing the document is to be obtained, from the print restriction information table 101, when the print job decider 103 has decided that the print job received by the print job receiver 102 is for printing the document registered in the print restriction information table 101, and transmits a notice to the effect that the print job for printing the document has been received by the image forming apparatus 1, to all of the approvers, through the network interface unit 91. The print job reception notifier 104 transmits the mentioned notice to the approvers, for example via e-mail.

In the case where the order of approval of the approvers is registered in the print restriction information table 101 as shown in FIG. 4, the print job reception notifier 104 first transmits, through the network interface unit 91, the notice to the approver at the first place in the order of approval, and then transmits the notice to the approver at the next place in the order of approval, after the approval is obtained from the approver at the first place.

The network interface unit 91 receives, as the approval for execution of the print job received by the print job receiver 102, the print job that is the same as the print job received by the print job receiver 102, from the respective user terminals 4 of all the approvers to whom the print job reception notifier 104 has transmitted the mentioned notice.

The print job reception notifier 104 continues with the mentioned transmission of the notice, including transmitting the notice to the approver at the first place in the order of approval, and then transmitting the notice to the approver at the next place in the order of approval, after the approval is received by the network interface unit 91 from the approver at the first place, until the approval from the approver at the last place in the order of approval is received by the network interface unit 91.

The print job executor 105 executes the print job received by the print job receiver 102, when the approval for execution of the print job received by the print job receiver 102 is received by the network interface unit 91, from all of the approvers to whom the print job reception notifier 104 has transmitted the notice.

In other words, the print job executor 105 decides that the approval for execution of the print job received by the print job receiver 102 has been obtained from the approver, upon receipt of the print job that is the same as the print job received by the print job receiver 102, from the user terminal 4 of the approver, and executes the print job received by the print job receiver 102. In this case, thus, the same print job represents the approval by the approver. Through the mentioned process, the print job received by the print job receiver 102 is executed by the image forming unit 12 and the fixing unit 13, and the printed sheet is outputted.

When the print job executor 105 decides whether the print job transmitted from the approver is the same as the print job received by the print job receiver 102, the print job executor 105 may acquire, for example, the name of the document that is the target of each of the print jobs, from the meta-information accompanying the respective print jobs, in the same way as performed by the print job decider 103, to thereby decide whether the two print jobs are the same, depending on whether the document names agree with each other.

Further, the approver transmits the own user ID and host name to the image forming apparatus 1, together with the print job, serving as the approval, from the user terminal 4 managed by the approver. The print job executor 105 decides whether the user ID and the host name, received by the network interface unit 91 together with the print job, agree with the approver identification information, stored in the print restriction information table 101 in association with the document that is the target of the print job. In the affirmative case, the print job executor 105 decides that the approver who has transmitted the approval is the approver from whom the approval for printing the document is to be obtained. In the example shown in FIG. 4, only when the approval is transmitted by the user identified by the user ID "USER 135" from the user terminal 4 identified by the host name "HOSTPC23", the print job executor 105 regards the user as the approver for printing the document named as "document 1".

Here, in the case where the time limit is specified with respect to the approval for execution of the print job, the print job executor 105 executes the print job when the approval for execution of the print job is obtained from all the approvers within the time limit.

In this embodiment, the approval for execution of the print job received by the print job receiver 102 is not granted to the image forming apparatus 1, unless the approvers each open, upon receipt of the notice from the print job reception notifier 104 requesting for approval, the document that is the same as the document cited by the notice, in the own user terminal 4, and further perform the operation for printing the document. Therefore, it can be assured that, when the document under print restriction is to be printed, the approval for printing is granted only after the approver has confirmed the content of the document.

Figure 5:
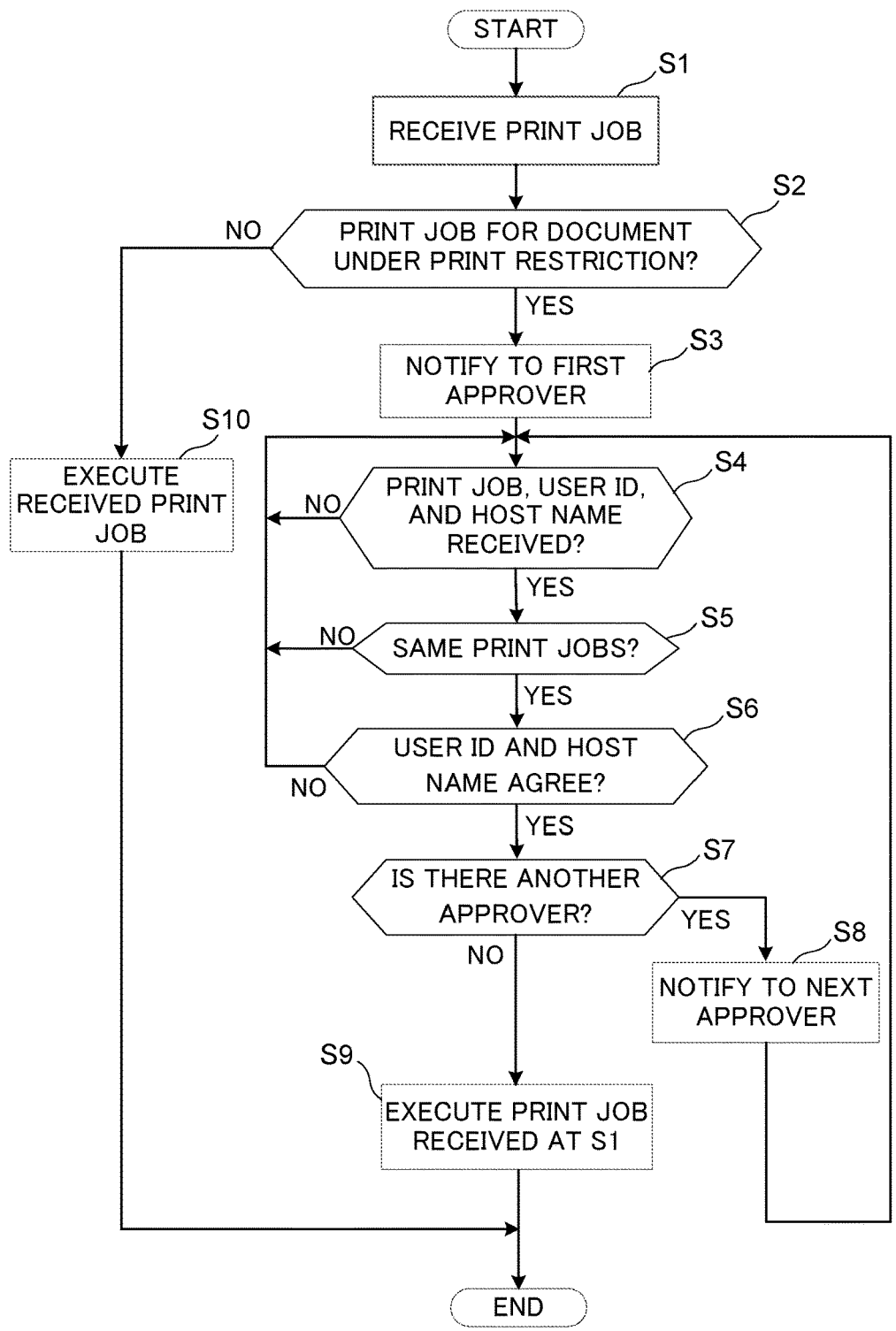
FIG. 5 is a flowchart showing a printing process of a document under print restriction set by the image forming apparatus.

Hereunder, a printing operation of the document under print restriction, performed by the image forming apparatus 1, will be described. FIG. 5 is a flowchart showing a printing process of the document under the print restriction set by the image forming apparatus 1.

When a document is to be printed using the image forming apparatus 1 as the output device, according to an instruction from a given one of the user terminals 4 or the server apparatus 8, the user terminal 4 or the server apparatus 8 generates the print job for printing the document, and transmits the print job to the image forming apparatus 1. The print job receiver 102 receives the print job through the network interface unit 91 (S1: print job reception step).

When the print job receiver 102 receives the print job, the print job decider 103 decides whether the print job is for printing a document registered in the print restriction information table 101, in other words for printing a document under print restriction (S2: print job decision step). In the case where the print job decider 103 has decided that the print job received by the print job receiver 102 is not for printing the document under print restriction (NO at S2), the print job executor 105 immediately executes the print job received at step S1, by causing the image forming unit 12 to form the image according to the print job, because the print job received at step S1 is a print job for a document free from print restriction, which should be immediately executed (S10).

Figure 6:
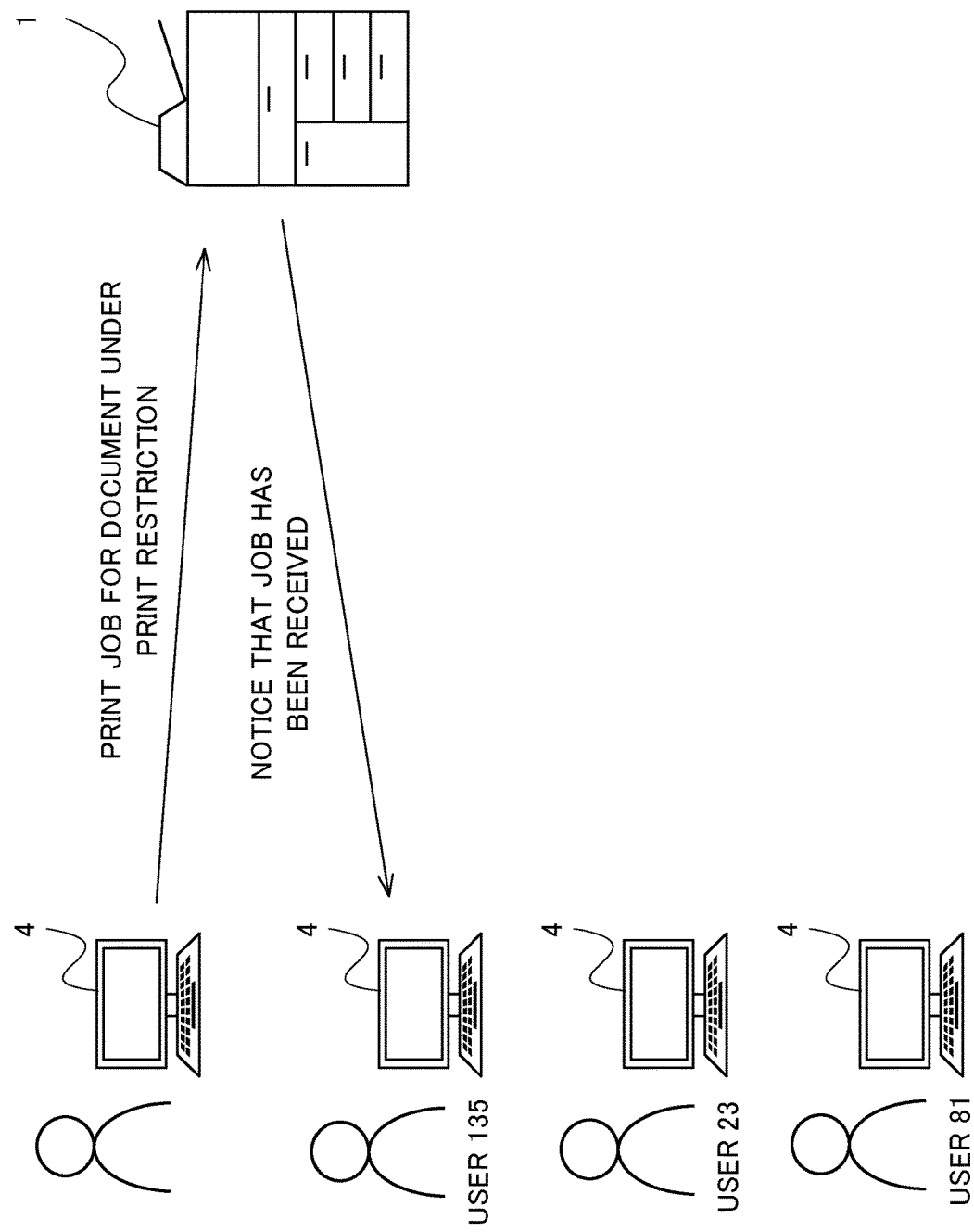
FIG. 6 is a conceptual drawing showing how the image forming apparatus requests for approval to an approver.

In contrast, in the case where the print job decider 103 has decided that the print job received by the print job receiver 102 is for printing the document under print restriction (YES at S2), the print job reception notifier 104 reads out all the approvers from whom the approval for execution of the print job for the document is to be obtained, from the print restriction information table 101, and transmits the notice to the effect that the print job for printing the document has been received, to the approver at the first place in the order of approval among all of the approvers, through the network interface unit 91, as illustrated in the conceptual drawing of FIG. 6 (S3: print job reception notification step).

In the example shown in FIG. 4, the print job reception notifier 104 transmits the information indicating that the print job for printing the document named as "document 1" has been received, to the user terminal 4 identified by the host name "HOSTPC23", owned by the user identified by the user ID "USER 135", who is at the first place in the order of approval, thus transmitting the notice to the approver.

In the user terminal 4 of the approver, when the notice is received through an own communication unit, for example a controller causes a display unit, such as an LCD, to display the content of the notice, in other words to the effect that the print job for printing the document under print restriction, for example the document named as "document 1", has been received by the image forming apparatus 1. In the case where the user, who is the approver, approves the print job for printing the document with the image forming apparatus 1, in view of the mentioned display, the user inputs an activation instruction for a printer driver, through the operation unit of the user terminal 4, and also operates the printer driver to input a print instruction of the document. The printer driver reads out the document stored in a HDD or a non-volatile memory according to the print instruction, and generates the print job for printing the document. When the print job is thus generated, the printer driver transmits the print job, the user ID of the approver, and the host name of the user terminal 4, to the image forming apparatus 1 through the communication unit of the user terminal 4.

In the image forming apparatus 1, the print job executor 105 decides whether the network interface unit 91 has received the print job, the user ID of the approver, and the host name of the user terminal 4, from the user terminal 4 of the approver who has received the notice (S4).

In the case where the network interface unit 91 has not received the print job, the user ID, and the host name from the user terminal 4 of the approver who has received the notice (NO at S4), the print job executor 105 stands by until the network interface unit 91 receives the mentioned information.

In the case where the print job executor 105 decides that the network interface unit 91 has received the print job, the user ID, and the host name from the user terminal 4 of the approver who has received the notice (YES at S4), the print job executor 105 once stores the received print job in the storage region of the image memory 32 or the HDD 92, and does not execute the received print job at this point. The print job executor 105 checks whether the network interface unit 91 has received the print job from the user terminal 4 of the approver, only to determine whether the print job received by the print job receiver 102 is to be executed. In other words, the network interface unit 91 receives the print job from the user terminal 4 of the approver who has received the notice, as approval for execution of the print job received by the print job receiver 102.

In the case of YES at step S4, the print job executor 105 decides whether the print job from the user terminal 4 of the approver, received by the network interface unit 91, and the print job received by the print job receiver 102 at step S1 are the same (S5).

In the case where the print job executor 105 decides that the print job from the user terminal 4 of the approver, received by the network interface unit 91, and the print job received by the print job receiver 102 at step S1 are the same (YES at S5), the print job executor 105 further decides whether the user ID and the host name received from the user terminal 4 of the approver together with the print job agree with the user ID and the host name indicated by the approver identification information, stored in the print restriction information table 101 in association with the document checked at step S2 (S6).

In the case where the print job executor 105 decides that the user ID and the host name received from the user terminal 4 of the approver together with the print job agree with the user ID and the host name indicated by the approver identification information stored in the print restriction information table 101 (YES at S6), the print job reception notifier 104 looks up the print restriction information table 101, to decide whether there is another approver, with respect to the document that is the target of the print job received by the print job receiver 102 at step S1 (S7).

In the case where the print job reception notifier 104 decides that there is another approver, with respect to the document that is the target of the print job received by the print job receiver 102 at step S1 (YES at S7), the print job reception notifier 104 transmits, through the network interface unit 91, the notice to the effect that the print job for printing the document under print restriction has been received by the image forming apparatus 1, to the user terminal 4 of the approver at the next place in the order of approval, stored in the print restriction information table 101 with respect to the document (S8: print job reception notification step). In the example shown in FIG. 4, since the user identified by the user ID "USER 23" is registered next to the user identified by the user ID "USER 135" in the order of approval, the print job reception notifier 104 further transmits the notice to the effect that the print job for printing the document under print restriction has been received by the image forming apparatus 1, to the user terminal 4 of the user at the next place in the order of approval, regarded as another approver. Thereafter, the operation returns to step S4, and the processes from step S4 to step S8 are performed with respect to the respective user terminals 4 of all the approvers, according to the order of approval.

In other words, the print job reception notifier 104 performs the process including transmitting the notice to the user terminal 4 of the approver at the first place in the order of approval, through the network interface unit 91, and then transmitting the notice, after the network interface unit 91 receives the approval from the user terminal 4 of the first approver, to the user terminal 4 of the approver at the next place in the order of approval, until the network interface unit 91 receives the approval from the approver at the last place in the order of approval.

When the print job executor 105 decides, as illustrated in the conceptual drawing of FIG. 7, that the notice has been transmitted to the user terminals 4 of all the approvers, and that the approval has been received from the user terminals 4 of all the approvers (NO at S7), the print job executor 105 executes the print job, received by the print job receiver 102 and stored in the HDD 92 (S9: print job execution step). Thus, the printed sheet of the document under print restriction is outputted from the image forming apparatus 1. In the case where there is only one approver, from whom the approval for execution of the print job received at step S1 is to be obtained, the processes from step S4 to step S8 are performed only once, and step S8 is skipped.

In the case where the time limit for the approval is specified, the print job executor 105 starts to keep time from the time point that the print job has been received at step S1, and executes the print job in the case where the approval for execution of the print job is received from the user terminals 4 of all the approvers, within the time limit from the mentioned time point.

In the case where the print job executor 105 decides at step S5 that the print job from the user terminal 4 of the approver and the print job received by the print job receiver 102 at step S1 are not the same (NO at S5), and where the print job executor 105 decides at step S6 that the user ID and the host name received from the user terminal 4 of the approver together with the print job do not agree with the user ID and the host name indicated by the approver identification information stored in the print restriction information table 101 (NO at S6), the operation returns to step S4. In the case of NO at step S5 or step S6, the print job received at step S4 is for a document free from print restriction, which should be immediately printed, since only one document is stored in the print restriction information table 101 shown in FIG. 4 in this embodiment. Therefore, the print job executor 105 immediately executes the print job received at step S4, by causing the image forming unit 12 to form the image according to the print job. Then the operation returns to step S4. The processes from step S4 to step S8 are repeated, until these processes are completed with respect to the user terminals 4 of all the approvers.

According to this embodiment, as described above, when the print job for printing the document under print restriction is received by the image forming apparatus 1, the image forming apparatus 1 executes the print job for printing the document under print restriction, only when all of the approvers for the printing of the document have transmitted the print job to the image forming apparatus 1, from the respective user terminals 4. Accordingly, the printing of the document is not permitted when the approver simply transmits the permission for the printing. In other words, the printing of the document under print restriction is not executed by the image forming apparatus 1, unless the print job for printing the document is generated, and the print job is transmitted. The approver inputs the print instruction for the document, after opening the document under print restriction and visually recognizing the content, and therefore the approver can confirm the content of the document.

Here, in the printing system according to the background art, a document is restricted from being printed for the sake of security, and printing of such a document is permitted only when the approval is obtained, for example, from a superior (approver). In such a case, however, the superior, acting as the approver, may approve the printing of the document without confirming the content of the document, which leads to degradation of the security of the document. Therefore, a system has to be designed such that the printing of a document is approved only when the approver has confirmed the content of the document.

In contrast, the arrangement according to the foregoing embodiment allows the approver to confirm the content of the document before granting the approval, when the document under print restriction is to be printed.

In addition, the image forming apparatus 1 is not permitted to print the document under print restriction, unless the image forming apparatus 1 receives the print job for printing the document that is the same as the document under print restriction, from the approver. Accordingly, the approver is requested to follow a more complicated procedure, compared with simply approving the printing of the document, and therefore the approver is led to be more conscious about the security, with respect to the approval for printing the document under print restriction.

Although the print job executor 105 is configured to decide at step S6 whether the user ID and the host name received from the user terminal 4 of the approver together with the print job agree with the user ID and the host name indicated by the approver identification information stored in the print restriction information table 101 in association with the document decided at step S2, only either of the user ID and the host name may be transmitted from the user terminal 4 of the approver together with the print job, so that the print job executor 105 may decide whether the user ID or the host name that has been transmitted agrees with the approver identification information stored in the print restriction information table 101.

In this case, for example when the host name is omitted, the print job executor 105 can perform the subsequent operations on the assumption that the user is the approver, irrespective of which of the user terminals 4 is being used by the user. When the user ID is omitted, the print job executor 105 can perform the subsequent operations on the assumption that the user operating the user terminal 4 is the approver, irrespective of which of the users is operating the user terminal 4, provided that the print job is received from the user terminal 4 possessing the host name.

The disclosure is in no way limited to the foregoing embodiment, but may be modified in various manners. For example, although the image forming apparatus 1 is exemplified by a multifunction peripheral in the embodiment, the image forming apparatus according to the disclosure may be a printer, or the like.

The configurations according to the embodiment, described with reference to FIG. 1 to FIG. 7, are merely exemplary and in no way intended to limit the disclosure to those configurations.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a print restriction information table stored in a storage unit, and containing a document under print restriction, and an approver from whom approval for execution of a print job for printing the document is to be obtained, in association with each other;
   a communication unit that is a network interface performing communication with a terminal managed by the approver; and
   a control unit including a processor,
   wherein, when the processor executes a computer program, the control unit acts as:
      a print job receiver that receives a print job for printing the document;
      a print job decider that decides whether the print job received by the print job receiver is a print job for printing a document registered in the print restriction information table;
      a print job reception notifier that reads out the approver from whom the approval for execution of the print job is to be obtained, from the print restriction information table, when the print job decider has decided that the print job is for printing the document registered in the print restriction information table, and transmits a notice that the print job for printing the document has been received, to the terminal managed by the approver, through the communication unit; and
      a print job executor that executes the print job received by the print job receiver, when the communication unit has received the print job that is same as the print job received by the print job receiver, from the terminal managed by the approver and to which the print job reception notifier has transmitted the notice,
   when there are a plurality of the approvers, the print restriction information table contains an order of approval of the approvers,
   the print job reception notifier performs an operation including transmitting the notice to the terminal managed by the approver at a first place in the order of approval, and transmitting the notice to a terminal of the approver at a next place in the order of approval, when the same print job is received by the communication unit from the terminal managed by the approver at the first place, until the same print job is received by the communication unit from the approver at a last place in the order of approval, and
   the print job executor executes the print job received by the print job receiver, when the same print job is received by the communication unit from all of the terminals respectively managed by the approvers.

2. The image forming apparatus according to claim 1,
   wherein the print restriction information table contains a time limit for receiving the same print job from all of the terminals respectively managed by the approvers, from a time point that the print job for printing the document under print restriction is received by the print job receiver, and
   the print job executor executes the print job received by the print job receiver, when the same print job is received by the communication unit from all of the terminals respectively managed by the approvers, within the time limit.

3. The image forming apparatus according to claim 1,
   wherein the print restriction information table contains the approver in association with the document, in a form of approver identification information including a combination of a user ID and a host name,
   the communication unit receives the user ID and the host name, together with the same print job transmitted as the approval from the terminal of the approver, and
   the print job executor decides that the approver managing the terminal that has transmitted the approval is the approver associated with the document, when the user ID and the host name received by the communication unit agree with the approver identification information stored in the print restriction information table.

4. The image forming apparatus according to claim 3,
   wherein the print job executor utilizes only either of the user ID and the host name in the print restriction information table, for the decision, and
   the communication unit receives only either of the user ID and the host name that is utilized by the print job executor for the decision, from the terminal managed by the approver.

5. The image forming apparatus according to claim 1, wherein, when the communication unit receives the print job that is the same as the print job received by the print job receiver, from the terminal managed by the approver to whom the print job reception notifier has transmitted the notice, the print job executor determines that the print job received by the print job receiver is to be executed, and executes the print job received by the print job receiver, but not the same print job received by the communication unit from the terminal managed by the approver.

6. The image forming apparatus according to claim 1, wherein the print job decider acquires, from meta-information of the print job received by the print job receiver, a name of the document that is a target of the print job, and decides whether the print job received by the print job receiver is the print job for printing the document under print restriction registered in the print restriction information table, through comparison between the document name and a name of the document stored in the print restriction information table.

7. An image forming method comprising:

receiving a print job for printing a document;

deciding the print job including deciding, on a basis of a print restriction information table, whether the print job received in the receiving of the print job is a print job for printing a document registered in the print restriction information table, the print restriction information table being stored in a storage unit, and containing a document under print restriction, and an approver from whom approval for execution of a print job for printing the document is to be obtained, in association with each other;

notifying reception of the print job including reading out the approver from whom the approval for execution of the print job is to be obtained, from the print restriction information table, when it is decided, in the deciding of the print job, that the print job is for printing the document registered in the print restriction information table, and transmitting a notice that the print job for printing the document has been received, to a terminal managed by the approver; and executing the print job including executing the print job, when the print job that is same as the print job received in the receiving of the print job is received from the terminal managed by the approver, after the transmission of the notice in the notifying of the reception of the print job, when there are a plurality of the approvers, the print restriction information table contains an order of approval of the approvers, in the notifying of the reception of the print job, an operation including transmitting the notice to the terminal managed by the approver at a first place in the order of approval, and transmitting the notice to a terminal of the approver at a next place in the order of approval are preformed, when the same print job is received from the terminal managed by the approver at the first place, until the same print job is received from the approver at a last place in the order of approval, and in the executing the print job, the print job received by the print job receiver is executed, when the same print job is received from all of the terminals respectively managed by the approvers.

* * * * *